United States Patent
Drescher

(10) Patent No.: US 11,964,690 B2
(45) Date of Patent: Apr. 23, 2024

(54) LINEAR ACTUATOR COMPRISING A MEASURING DEVICE FOR DETERMINING A POSITION OF A LINEARLY MOVEABLE COMPONENT

(71) Applicant: Schaeffler Technologies AG & Co. KG, Herzogenaurach (DE)

(72) Inventor: Thomas Drescher, Wachenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/763,750

(22) PCT Filed: Jul. 16, 2020

(86) PCT No.: PCT/DE2020/100620
§ 371 (c)(1),
(2) Date: Mar. 25, 2022

(87) PCT Pub. No.: WO2021/058048
PCT Pub. Date: Apr. 1, 2021

(65) Prior Publication Data
US 2022/0324510 A1     Oct. 13, 2022

(30) Foreign Application Priority Data

Sep. 26, 2019    (DE) .................... 102019125883.9

(51) Int. Cl.
*B62D 15/02* (2006.01)
*B62D 5/00* (2006.01)
*B62D 5/04* (2006.01)
*G01D 5/20* (2006.01)

(52) U.S. Cl.
CPC ............. *B62D 15/02* (2013.01); *B62D 5/001* (2013.01); *B62D 5/0418* (2013.01); *G01D 5/20* (2013.01)

(58) Field of Classification Search
CPC ....... B62D 15/02; B62D 5/001; B62D 5/0418; B62D 7/146; B62D 15/0225; G01D 5/20; G01D 5/2013; G01D 5/2216
See application file for complete search history.

(56) References Cited

U.S. PATENT DOCUMENTS

| 4,944,356 A | * | 7/1990 | Oslapas | B62D 5/0424 |
| | | | | 180/400 |
| 5,083,626 A | * | 1/1992 | Abe | F16C 35/061 |
| | | | | 180/445 |
| 5,163,529 A | * | 11/1992 | Clement | B62D 15/0225 |
| | | | | 180/400 |

(Continued)

FOREIGN PATENT DOCUMENTS

| DE | 3735517 | 5/1988 |
| DE | 3703591 | 8/1988 |

(Continued)

*Primary Examiner* — Akm Zakaria
(74) *Attorney, Agent, or Firm* — Volpe Koenig

(57) ABSTRACT

A linear actuator for a steer-by-wire system including a component, in particular an axle or a shaft, that can be moved along a linear trajectory, and including a measuring device for determining a position of the component. The measuring device has a coil for inductively determining the position of the component, and the coil is arranged coaxially relative to the linear trajectory of the component.

20 Claims, 2 Drawing Sheets

(56) References Cited

U.S. PATENT DOCUMENTS

| | | | | |
|---|---|---|---|---|
| 5,644,227 A | * | 7/1997 | Geisel | C03B 9/1936 65/160 |
| 8,710,828 B1 | * | 4/2014 | Meisel | G01D 5/2013 324/207.17 |
| 2014/0218051 A1 | * | 8/2014 | Braun | F15B 15/2853 324/654 |
| 2014/0353071 A1 | * | 12/2014 | Ando | B62D 15/0225 180/445 |
| 2015/0300843 A1 | * | 10/2015 | Hunter | G01B 7/003 324/207.15 |

FOREIGN PATENT DOCUMENTS

| | | |
|---|---|---|
| DE | 3703591 A1 | 8/1988 |
| DE | 3730926 | 3/1989 |
| DE | 102008032046 | 1/2010 |
| EP | 0376456 | 7/1990 |
| GB | 2254154 A | 9/1992 |
| KR | 101547150 B1 | 8/2015 |

\* cited by examiner ately spaced apart from the trajectory of the component. Consequently, the disclosure enables a compact design of the linear actuator.

LINEAR ACTUATOR COMPRISING A MEASURING DEVICE FOR DETERMINING A POSITION OF A LINEARLY MOVEABLE COMPONENT

CROSS-REFERENCE TO RELATED APPLICATIONS

This application is the U.S. National Phase of PCT Appln. No. PCT/DE2020/100620, filed Jul. 16, 2020, which claims priority from German Patent Application No. DE 10 2019 125 883.9, filed Sep. 26, 2019, the entire disclosures of which are incorporated by reference herein.

TECHNICAL FIELD

The disclosure relates to a linear actuator for a steer-by-wire system with a component, in particular an axle or shaft, that can be moved along a linear trajectory, and comprising a measuring device for determining a position of the component. Furthermore, the disclosure relates to a method for determining the position of a component of a linear actuator for a steer-by-wire system, wherein the component, in particular an axle or a shaft, can be moved along a linear trajectory, and wherein the position of the component is determined using a measuring device.

BACKGROUND

A linear actuator of this type for a steer-by-wire system designed as the rear-axle steering system of a motor vehicle is known, for example, from DE 10 2008 032 046 A1. The linear actuator comprises a linearly movable component designed in the manner of a shaft and connected to pivotable wheel carriers of the motor vehicle in order to deflect the wheels of the motor vehicle. With such linear actuators, it is generally necessary to determine the position of the movable component along its linear trajectory for control purposes. Typically, measuring devices that require a relatively large installation space are used for this purpose. This may require the housing of the linear actuator to be enlarged or the measuring device to be located substantially outside the housing.

SUMMARY

Against this background, the object is to enable a compact design of a linear actuator for a steer-by-wire system.

The object is achieved by a linear actuator for a steer-by-wire system comprising a component, in particular an axle or a shaft, that can be moved along a linear trajectory, and comprising a measuring device for determining a position of the component, wherein the measuring device has a coil for inductively determining the position of the component, wherein the coil is arranged coaxially relative to the linear trajectory of the component.

The linear actuator according to the disclosure comprises a measuring device which has a coil for inductively determining the position of the linearly movable component. Placing the coil coaxially relative to the linear trajectory of the movable component allows the component to be immersed in the coil. The coil can be arranged together with the component within a common housing. It is not necessary to arrange the coil in a position spaced apart from the trajectory of the component. Consequently, the disclosure enables a compact design of the linear actuator.

Preferably, the coil is designed as a cylinder coil. The cylinder axis of the cylinder coil preferably coincides with the trajectory of the movable component. The cylinder coil is preferably designed as an air core coil.

According to an advantageous embodiment, it is provided that the coil is arranged on a coil carrier. The coil carrier can hold the coil in a position in which it is arranged to be coaxial relative to the trajectory of the component. Preferably, the coil is arranged on an outer contour of the coil carrier. The coil carrier can have a recess that allows the movable component to pass through the recess.

An advantageous embodiment provides that the coil carrier is designed as an injection-molded part, in particular as a plastic injection-molded part. This enables cost-effective manufacture of the coil carrier.

Preferred is an embodiment in which the coil carrier has a receiving region for the coil and a fastening region for fastening the coil carrier in a recess of a housing that encloses the trajectory of the component. Thus, the coil carrier can, on the one hand, provide a mount for the coil and, on the other hand, secure the coil within the housing. Preferably, the receiving region is designed to be hollow cylindrical so that the coil can be arranged on an outer contour of the receiving region and the movable component can be arranged in a recess or bore of the hollow cylindrical receiving region.

According to an advantageous embodiment, the linear actuator comprises a cover arranged in a recess of a housing enclosing the trajectory of the component, wherein the coil carrier is connected to the cover. Preferably, the coil carrier is connected to the cover by means of the fastening region of the coil carrier. The cover can be used to cover the recess of the housing and at the same time fix the coil carrier with the coil relative to the housing.

It is advantageous if the linear actuator comprises evaluation electronics connected to the coil, which evaluation electronics are preferably arranged within a cover located in a recess of a housing enclosing the trajectory of the component. The evaluation electronics can be arranged in the cover to save space. In particular, it is not necessary to provide external evaluation electronics, i.e. outside of the housing, which must be connected to the coil, for example, by cable or other electrical connection.

An advantageous embodiment provides that the measuring device comprises two, in particular exactly two, coils for inductively determining the position of the component, wherein the coils are arranged coaxially relative to the linear trajectory of the component. By using two coils, it is possible to perform a differential evaluation of the measurements. The signal of exactly one coil is not evaluated, but the difference of the signals of both coils. This can reduce the influence of interfering external fields and improve the robustness of the measurement. Preferably, the two coils are designed identically and/or arranged in mirror symmetry. Preferably, both coils are arranged on a coil carrier each. The coil carriers of the two coils can be connected to a cover each, arranged in a recess of a housing enclosing the trajectory of the component. Preferably, an evaluation unit is arranged in the cover and is connected to both coils. The evaluation unit is preferably configured to generate a difference between the signals measured by the two coils.

According to an advantageous embodiment, it is provided that a target made of a ferromagnetic material is arranged on the component. The target made of ferromagnetic material can be used to change the inductance of one coil or both coils, so that the position of the target, and thus the position of the component, can be determined as a function of the inductance of the coil.

According to an alternative, advantageous embodiment, it is provided that the component comprises a material transition or target contour detectable by the coil. Preferably, the material transition is one in which the magnetic properties of the material change. This material transition can change the inductance of one or both coils, similarly to a target attached to the component that has magnetic properties differing from those of the component.

According to another, alternative, advantageous embodiment, the component is formed from a ferromagnetic material and a target made of duplex steel is arranged on the component. The target can be used to change the inductance of one coil or both coils, so that the position of the target, and thus the position of the component, can be determined as a function of the inductance of the coil.

The disclosure further relates to a method for determining the position of a component of a linear actuator for a steer-by-wire system, wherein the component, in particular an axle or a shaft, is moved along a linear trajectory, and wherein the position of the component is determined by means of a measuring device which comprises a coil for inductively determining the position of the component and is arranged coaxially relative to the linear trajectory of the component.

The same advantages can be achieved with the method as have already been described in connection with the linear actuator. The advantageous embodiments and features explained in connection with the linear actuator can also be applied to the method alone or in combination.

BRIEF DESCRIPTION OF THE DRAWINGS

Further details and advantages of the disclosure will be explained below with reference to the exemplary embodiment shown in the drawings. In the figures.

DETAILED DESCRIPTION

Figure 1:
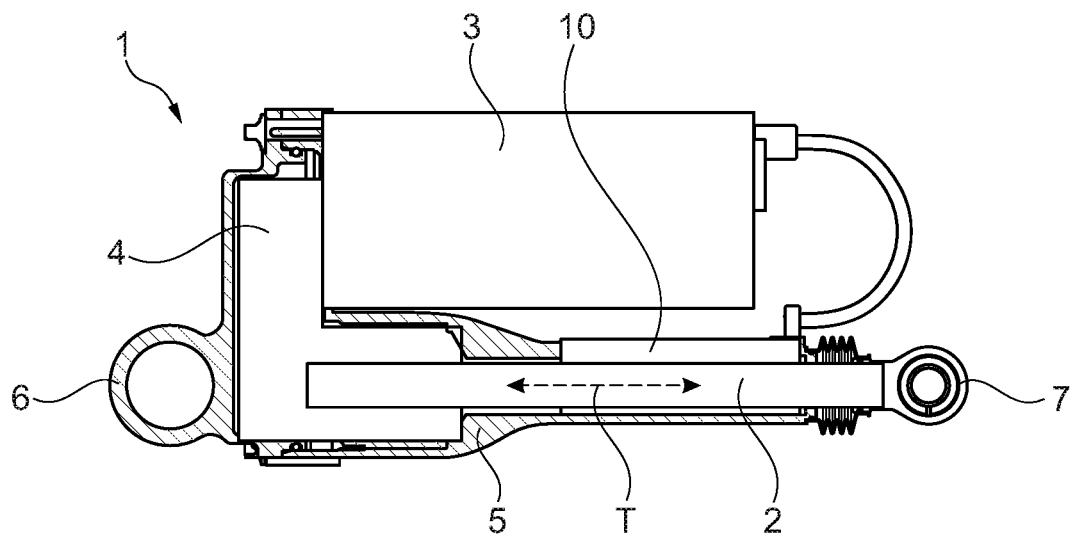
FIG. 1 shows a first exemplary embodiment of a linear actuator in a schematic sectional view.

FIG. 1 shows a first exemplary embodiment of a linear actuator 1 designed according to the disclosure. The linear actuator 1 is suitable for use as part of a rear-axle steering system of a motor vehicle and can deflect a wheel of the motor vehicle. The linear actuator 1 comprises a drive 3, which can be designed as an electric motor, for example. The drive 3 is coupled via a transmission 4 to a linearly movable component 2, which is designed in the manner of an axle. The transmission 4 is configured to convert a rotary motion of the drive 3 into a linear motion of the component 2. The component 2 is movable along a trajectory T that is linear and extends within a housing 5 of the linear actuator 1. On a side of the component 2 opposite the transmission 4, the component 2 is connected to a wheel carrier connecting element 7, to which a wheel carrier can be connected, which carries the wheel of the motor vehicle to be steered. In the exemplary embodiment, the wheel carrier connecting element 7 is designed as an eyelet. The housing 5 of the linear actuator 1 further comprises a fastening element 6, by means of which the linear actuator 1 can be fastened to a chassis element or a body part of a motor vehicle.

Another component of the linear actuator 1 is a measuring device 10 by means of which the position of the component 2 along its trajectory T can be determined. The measuring device 10 enables a compact design of the linear actuator 1 and will be described in more detail in connection with FIGS. 3 and 4.

Figure 2:
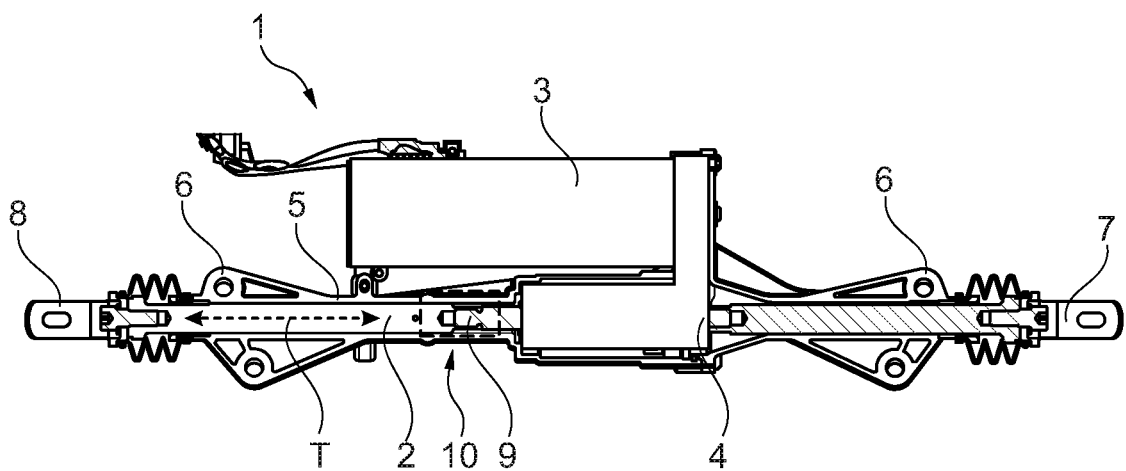
FIG. 2 shows a second exemplary embodiment of a linear actuator in a schematic sectional view.

The illustration in FIG. 2 shows a second exemplary embodiment of a linear actuator 1 according to the disclosure, in which such elements that exercise an identical function as in the linear actuator 1 according to the first exemplary embodiment are also denoted by identical reference signs. In contrast to the first exemplary embodiment, the linear actuator 1 according to the second exemplary embodiment is provided with a movable component 2, which is connected at two ends in each case to a wheel carrier connecting element 7, 8. Therefore, two wheels of a common axle can be deflected with the linear actuator 1 according to the second exemplary embodiment.

In FIG. 2, a region in which the measuring device 10 can be arranged to determine the position of the component 2 is indicated by dashed lines. Suitable measuring devices 10 are explained in connection with FIG. 3 and FIG. 4.

Figure 3:
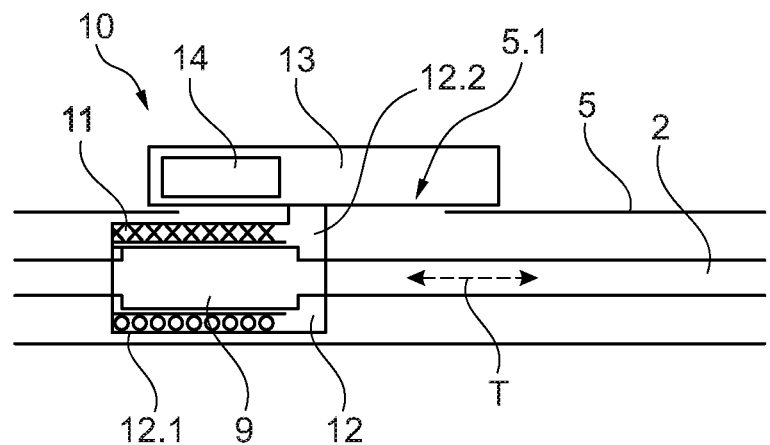
FIG. 3 shows a first exemplary embodiment of a measuring device that can be used with a linear actuator according to FIG. 1 or FIG. 2.

FIG. 3 shows a schematic representation of a measuring device 10 that can be used with a linear actuator according to the disclosure, for example as shown in FIG. 1 or FIG. 2. The measuring device 10 comprises a coil 11, by means of which the position of the component 2 can be inductively determined. According to the disclosure, the coil 11 is arranged coaxially relative to the linear trajectory T of the component 2 and can therefore be arranged completely inside the housing 5 of the linear actuator 1. This enables a compact design.

The coil 11 is arranged on a coil carrier 12, which is designed as an injection-molded part, for example as a plastic injection-molded part. The coil carrier 12 comprises a hollow cylindrical receiving region 12.1 for the coil 11 and a fastening region 12.2 for fastening the coil carrier 12 in a recess 5.1 of the housing 5. The fastening region 12.2 is connected to a cover 13. The cover 13 is arranged in a recess 5.1 of the housing 5 enclosing the trajectory of the component 2. Evaluation electronics 14 connected to the coil 11 are arranged inside the cover 13 and are used to evaluate the signals measured by the coil 11.

The component 2 according to FIG. 3 comprises a target contour 9 which is detectable by the coil 11. In the present case, the target contour 9 has a larger cross-section perpendicular to the trajectory T of the component 2. As soon as the target contour 9 moves with respect to the coil 11, it changes the inductance of the coil 11. The evaluation unit evaluates the signals measured by the coil 11 and uses the inductance or the change in inductance to determine the position of the target contour 9 and thus also the position of the component 2.

According to a variation of the exemplary embodiment shown in FIG. 3, the component 2 can have a material transition instead of or in addition to a target contour, which material transition can be detected by the coil 11. In such a material transition, the magnetic properties of the material of the component 2 change, for example because two sub-elements of the component 2 with different magnetic properties are adjacent to one another.

A further variation of the exemplary embodiment shown in FIG. 3 provides that a target made of a ferromagnetic material is formed on the component 2, or that the component 2 is formed from a ferromagnetic material and a target made of duplex steel is formed on the component 2.

Figure 4:
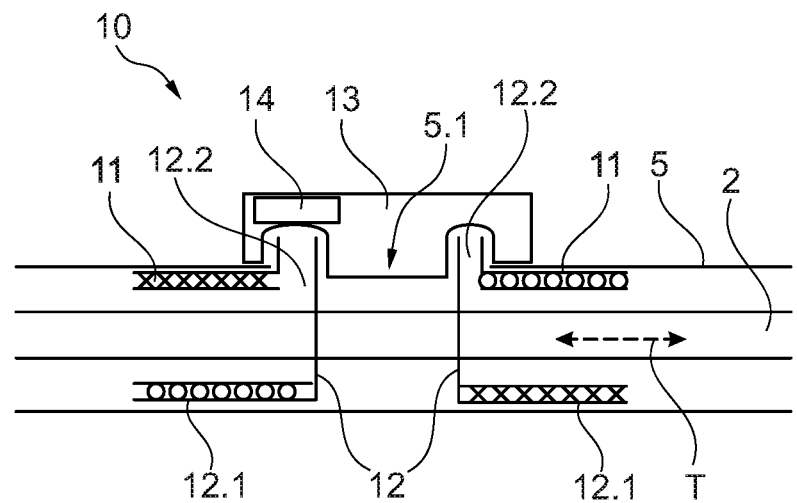
FIG. 4 shows a second exemplary embodiment of a measuring device that can be used with a linear actuator according to FIG. 1 or FIG. 2.

FIG. 4 shows another variant of a measuring device 1 for a linear actuator 1 according to the disclosure. This measuring device 1 is basically the same as the measuring device 1 according to FIG. 3, except that it comprises exactly two coils 11 for inductively determining the position of the component 2. Both coils 11 are mirror-symmetrical, arranged coaxially relative to the linear trajectory T of the component and are identical in design. Both coils 11 are connected to the evaluation electronics 14 and are configured in such a way that they can determine the difference between the signals measured by the two coils 11 and can use this to determine the position of the component 2.

The linear actuators 1 described above can be used to carry out a method for determining the position of a component 2 of the linear actuator 1 for a steer-by-wire system, wherein the component 2, in particular an axle or a shaft, is moved along the linear trajectory T, and wherein the measuring device 10 is used to determine the position of the component 2. The measuring device 10 comprises a coil 11 for inductively determining the position of the component 2 and is arranged coaxially relative to the linear trajectory T of the component 2.

LIST OF REFERENCE SIGNS

1 Linear actuator
2 Component
3 Drive
4 Transmission
5 Housing
5.1 Recess
6 Fastening element
7 Wheel carrier connecting element
8 Wheel carrier connecting element
9 Target contour
10 Measuring device
11 Coil
12 Coil carrier
12.1 Receiving region
12.2 Fastening region
13 Cover
14 Evaluation electronics
T Trajectory

The invention claimed is:

1. A linear actuator for a steer-by-wire system, the linear actuator comprising:
a component that is movable along a linear trajectory;
a measuring device configured for determining a position of the component;
wherein the measuring device has a coil for inductively determining the position of the component, and the coil is arranged coaxially relative to the linear trajectory of the component, arranged on a coil carrier and within a hollow cylindrical receiving region of the coil carrier, and arranged within a housing of the linear actuator;
wherein the coil carrier includes a fastening region for fastening the coil carrier in a recess of the housing which encloses the trajectory of the component, the recess and at least a portion of the fastening region being radially outward of the coil.

2. The linear actuator according to claim 1, further comprising a cover which is arranged in the recess of the housing, and the coil carrier is connected to the cover.

3. The linear actuator according to claim 1, further comprising evaluation electronics connected to the coil.

4. The linear actuator according to claim 1, wherein the measuring device further comprises a second coil such that there are two of the coils for inductively determining the position of the component, and the coils are arranged coaxially relative to the linear trajectory of the component.

5. The linear actuator according to claim 1, further comprising a target made of a ferromagnetic material arranged on the component.

6. The linear actuator according to claim 1, wherein the component comprises a material transition or target contour detectable by the coil.

7. The linear actuator according to claim 1, wherein the component is formed from a ferromagnetic material and a target made of duplex steel is arranged on the component.

8. A method for determining a position of a component of a linear actuator for a steer-by-wire system, the method comprising:
moving the component along a linear trajectory, and
determining the position of the component by a measuring device which comprises a coil for inductively determining the position of the component, the coil is arranged coaxially relative to the linear trajectory of the component, arranged on a coil carrier and within a hollow cylindrical receiving region of the coil carrier, and arranged within a housing of the linear actuator;
wherein the coil carrier includes a fastening region for fastening the coil carrier in a recess of the housing which encloses the trajectory of the component, the recess and at least a portion of the fastening region being radially outward of the coil.

9. A linear actuator, comprising:
a component that is movable along a linear trajectory;
a measuring device configured for determining a position of the component;
wherein the measuring device has a coil for inductively determining the position of the component, and the coil is arranged coaxially relative to the linear trajectory of the component; and
wherein the coil is arranged on a coil carrier that is connected to a cover, the cover being arranged in a recess of a housing, and evaluation electronics connected to the coil are arranged inside the cover for evaluating signals measured by the coil.

10. The linear actuator according to claim 9, wherein the coil carrier has a receiving region for the coil and a fastening region for fastening the coil carrier in the recess of the housing which encloses the trajectory of the component.

11. The linear actuator according to claim 9, wherein the recess of the housing is arranged radially outward of the coil.

12. The linear actuator according to claim 9, wherein the measuring device further comprises a second coil such that there are two of the coils for inductively determining the position of the component, and the coils are arranged coaxially relative to the linear trajectory of the component.

13. The linear actuator according to claim 9, further comprising a target made of a ferromagnetic material arranged on the component.

14. The linear actuator according to claim 9, wherein the component comprises a material transition or target contour detectable by the coil.

15. The linear actuator according to claim 9, wherein the component is formed from a ferromagnetic material and a target made of duplex steel is arranged on the component.

16. The linear actuator according to claim 9, wherein the coil is arranged completely within the housing of the linear actuator.

17. The linear actuator according to claim 1, wherein the coil is arranged completely within the housing of the linear actuator.

18. The linear actuator according to claim 1, wherein the fastening region is positioned adjacent an axial end of the coil carrier.

19. The method according to claim 8, wherein the fastening region is positioned adjacent an axial end of the coil carrier.

20. The linear actuator according to claim 9, wherein the evaluation electronics are positioned radially outward of the coil and the coil carrier.

\* \* \* \* \*